(No Model.)

W. P. BUTLER.
ATTACHMENT FOR VAPOR BURNERS.

No. 415,612. Patented Nov. 19, 1889.

Witnesses:
Robt. Everett,
J. A. Rutherford.

Inventor:
William P. Butler.
By James L. Norris,
Atty.

United States Patent Office.

WILLIAM P. BUTLER, OF CHICAGO, ILLINOIS.

ATTACHMENT FOR VAPOR-BURNERS.

SPECIFICATION forming part of Letters Patent No. 415,612, dated November 19, 1889.

Application filed March 28, 1889. Serial No. 305,158. (No model.)

*To all whom it may concern:*

Be it known that I, WILLIAM P. BUTLER, a citizen of the United States, residing at Chicago, in the county of Cook and State of Illinois, have invented new and useful Improvements in Attachments for Vapor-Burners, of which the following is a specification.

The object of my invention is to provide a removable attachment for vapor-burners, whereby the heavy and unvaporized portions of the oil can be trapped out of the oil-feed pipe and detained in a detachable receptacle located below the feed-pipe and in such proximity to the heated burner as to induce a further and more complete vaporization of any less heavy portions of the oil that may escape into said receptacle, while the heavier unvaporizable portions are condensed and retained in the lower part of said receptacle until it is detached and emptied, said receptacle having means whereby it may be closed without interfering with the free passage of oil from the oil-feed pipe to the burner.

The object of my invention I accomplish by the combination of devices hereinafter described and claimed, reference being made to the accompanying drawings, in which—

Figure 1:
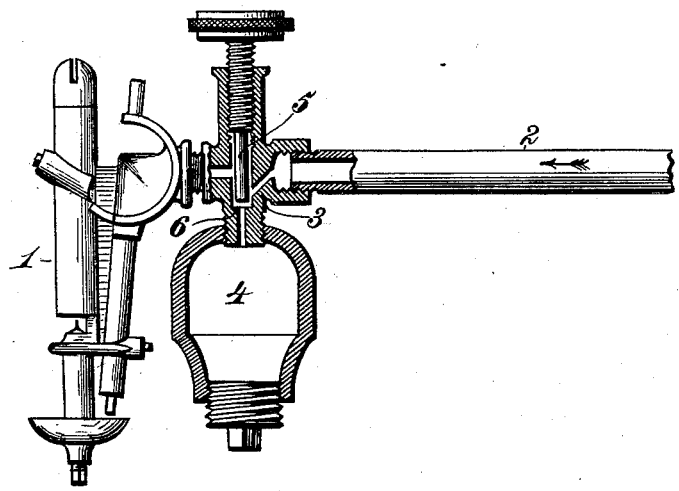
Figure 2:
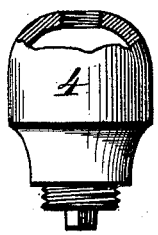

Figure 1 is a view of a vapor-burner with my trap attachment applied, showing the feed-pipe and detachable valved trap or condenser partly in section. Fig. 2 is a view of the trap attachment detached.

Referring to the drawings, the numeral 1 designates a vapor-burner of well-known construction, and 2 the usual oil-feed pipe or packing-tube. Connected with the feed pipe or tube 2 in any suitable manner and communicating therewith is a cross-shaped T or fitting 3, having a screw-threaded lower end, to which is attached a removable trap or receptacle 4, into which the heavy or unvaporized portions of the oil passing through the feed-pipe 2 will be deposited in a condensed form, while the vapor generated in said feed pipe or tube will pass on to the burner. The cross-shaped T or fitting 3 serves as a casing for a valve 5, that is adapted to be moved downward to prevent the access of oil to the trap or receptacle 4 without cutting off the supply to the burner.

The T or valve-casing 3 and attached trap or receptacle 4 should be located sufficiently near the burner to become somewhat heated while the burner is in use, thereby vaporizing the less heavy portions of oil contained in the receptacle and its connecting-tube, the vapor thus generated being caused to pass into the valve-casing 3, and thence on to the burner. Every few days the trap or receptacle 4 is detached by unscrewing it from the casing 3, and after emptying the heavy oil accumulated therein the receptacle is replaced.

Water-traps have heretofore been used in connection with vapor-burners; but they have been placed away from the burner, usually at the valve. The result of such arrangement is that the water-trap is frequently filled with water, and in cold weather the water freezes and bursts the trap. This old trap is practically useless for catching sediment and heavy oils.

I am aware that a sediment-receptacle located immediately below the oil-supply tube back of and below the gas-passage is old as well as a sediment-receptacle located immediately below the gas or vapor passage; but these I do not broadly claim.

In my construction by means of the crooked or angular passage leading to the trapping or condensing receptacle the water and heavy oils are led downward and will not readily rise to go through the burner until they are vaporized by the heat of the burner. Thus by placing my trapping and condensing receptacle near the burner all the vaporized portions of oil are passed through the burner safely, and the heavy portions of oil which cannot be vaporized are allowed to fall into said receptacle, the lower part of which being comparatively cold has a tendency to condense all those portions of oil which are unvaporizable. I have found in practice that the naphtha or gasoline which is entirely too heavy to burn in the ordinary burner can be used with this attachment.

By making the trapping and condensing receptacle in the manner described it can be easily and conveniently removed for cleansing whenever desired, and by reason of its being thus detachable the necessary cleansing can be more readily and thoroughly effected.

The valve 5 enables the trap 4 to be shut off from the feed-pipe 2 whenever desired. It will be observed that the lower portion of the valve which crosses the feed-tube is reduced in diameter to permit oil and vapor to pass readily around it. The lower portion of the vertical bore of the valve-casing 3 is also reduced in diameter and forms a valve-seat 6 within said casing, so that by shutting the valve down the trap 4 can be detached without extinguishing the light or incurring any waste of oil or vapor when it becomes necessary to cleanse the trap or condenser.

What I claim as my invention is—

1. The combination, with a vapor-burner and its oil-feed pipe, of a trap for the heavy oil suspended from the oil-pipe in close proximity to and heated by the burner, and a valve to prevent the passage of oil from the oil-feed pipe into the trap, and at the same time permit the oil to continuously flow from the oil-feed pipe into the burner, substantially as described.

2. The combination, with a vapor-burner and its oil feed-pipe, of a valve-casing connecting one extremity of the feed-pipe to the burner, a trap for the heavy oil suspended from the said interposed valve-casing in close proximity to and heated by the burner to vaporize the vaporizable portions of the trapped heavy oil, and a valve to prevent the passage of oil into the trap and at the same time permit the oil to continuously flow direct from the feed-pipe into the burner, substantially as described.

In testimony whereof I have affixed my signature in presence of two witnesses.

WILLIAM P. BUTLER.

Witnesses:
    JAS. L. NORRIS,
    JAMES A. RUTHERFORD.